3,472,735
PRESERVATION OF SEMEN
Yoshimasa Nishikawa, Ashiya, and Toshio Hayami, Tokyo, Japan, assignors to Takeda Chemical Industries, Ltd., Higashi-ku, Osaka, Japan
No Drawing. Filed Apr. 25, 1967, Ser. No. 633,366
Claims priority, application Japan, Apr. 28, 1966, 41/27,264; June 8, 1966, 41/37,274
Int. Cl. C12k 9/00; A61k 17/06
U.S. Cl. 195—1.8
33 Claims

ABSTRACT OF THE DISCLOSURE

The livability and motility of the spermatozoa in the semen preparation for artificial insemination of livestock, especially of ruminant livestock, are heightened and maintained so that the fertliizing capacity of the spermatozoa is heightened and maintained for an extended period of time by adding to the semen preparation thiol-type thiamine derivatives i.e. unsymmetrical thiamine organic disulfide derivatives, S-acyl-thiamine derivatives, bisthiamine-disulfide derivatives or mixtures thereof in a concentration range of from about 0.001% to about 0.1% (weight/volume).

---

This invention relates to a method for heightening and maintaining the livability and motility of the spermatozoa in the semen preparation for artificial insemination of livestock and also to a stabilized semen preparation for artificial insemination of livestock.

In recent years, artificial insemination has widely been accepted in livestock reproduction such as cattle, goat and sheep. The object of which of course is not only to reproduce farm animals efficiently but also to make full use of selective semen from proven sires for the genetic improvement of breed. For effecting artificial insemination, semen collected from the male animal is at first stored outside the body and then inseminated to the female animal selected optionally. Therefore, the reasonable operation of the artificial insemination depends fully upon the satisfactory storage of semen for a long time outside the body.

In general, the animal semen for artificial insemination is stored after it is diluted with a suitable semen diluter, and the kind of the diluter and the temperature for the storage have close connection with the livability and motility of the spermatozoa in the diluted semen, and thus with the fertilizing capacity thereof.

For the storage of the diluted semen, the metbolism of the spermatozoa must be appropriately suppressed. Lowering the storage temperature is generally adopted for this purpose. In this viewpoint, the hitherto-employed processes for storing semen for artificial insemination can be divided into two groups i.e. so-called liquid semen method and so-called deep freezing method. The liquid semen method consists in diluting semen collected from male animals to about 5 to 20 times of its original volume with a semen diluter and subsequently keeping the diluted semen at a low temperature of about 4° C. until actual use thereof.

The deep freezing method comprises diluting semen collected from male animals to about 3 to 10 times of its original volume with a semen diluter (the primary dilution), cooling the resultant diluted semen at about 4° C. gradually for about 1 hour, further diluting the diluted semen to about 2 times of the volume with the semen diluter supplemented with glycerin as an antifreezing agent (secondary dilution), keeping the diluted semen at about 4° C. for about 6 to 18 hours in order to permeate glycerin into the spermatozoan cells (glycerin equillibrium), then freezing and storing at a ultra-low temperature of about −80° C. or of about −196° C., and thawing the frozen semen at a temperature of about 4° C. or about 37° C. before the use of the semen.

The liquid semen method, however, entails drawbacks that the livability and motility of the spermatozoa in the diluted semen lowers with the lapse of the storage time since the metabolism of spermatozoa cannot be sufficiently inhibited, and therefore, the artificial insemination with the use of the diluted semen stored for relatively long period beyond five days results in low conception rate. Similarly the deep freezing method entails drawbacks that the livability and motility of spermatozoa in the thawed semen obtained by thawing the frozen semen lowers with the lapse of time although the livability and motility of the spermatozoa in the frozen semen are kept at rather stable conditions throughout the period of freezing storage.

Thus, it has been one of the most important desirata in the field of stockbreeding to establish a method for keeping spermatozoa in the diluted semen and the thawed semen from the frozen semen viable for a long time.

It is an object of the present invention to provide a method for heightening and maintaining the livability and motility of spermatozoa in a semen preparation for artificial insemination of livestock. Another object of the present invention is to provide a stabilized semen preparation suitable for a long storage of the semen. Other objects will be apparent from the detailed description of the present invention hereinafter provided.

In accordance with one embodiment of the present invention, it is now found that the livability and motility of the spermatozoa of livestock, especially of ruminant livestock such as cattle, goat, sheep, in the semen preparation e.g. the diluted semen and the thawed semen from the frozen semen can be heightened and maintained so that the fertilizing capacity of the spermatozoa can be heightened and maintained for an extended period of time by the presence of a small amount of a certain thiol-type thiamine derivatives.

The thiol-type thiamine derivatives to be contained in the semen preparation includes unsymmetrical thiamine organic disulfide derivatives, S-acyl-thiamine derivatives and bisthiamine-disulfide derivatives.

As the unsymmetrical thiamine organic disulfide derivatives, there may be enumerated the following compounds.

UNSYMMETRICAL THIAMINE ORGANIC DISULFIDE DERIVATIVES

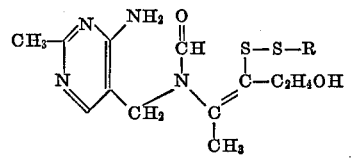

| Compounds | R |
|---|---|
| Thiamine tetrahydrofurfuryl disulfide. | $-CH_2-\underset{\underset{O}{\diagdown\diagup}}{\overset{CH_2-CH_2}{\overbrace{CH_2\ \ \ CH_2}}}$ |
| Thiamine allyl disulfide | $-CH_2CH=CH$ |
| Thiamine 2-hydroxyethyl disulfide. | $-C_2H_4OH$ |
| Thiamine (7-methoxycarbonyl-3-acetylthioheptyl) disulfide. | $-CH_2\underset{\underset{SCOCH_3}{\big\vert}}{\overset{CH_2}{\diagup\diagdown}}CH(CH_2)_4COOCH_3$ |
| Thiamine propyl disulfide | $-C_3H_7$ |

As the S-acyl-thiamine derivatives there may be enumerated the following compounds.

S-ACYL-THIAMINE DERIVATIVES

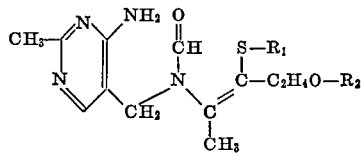

| Compounds | R₁ | R₂ |
|---|---|---|
| O,S-dibenzoyl-thiamine | $-CO-\langle\rangle$ | $-CO-\langle\rangle$ |
| O,S-diacetyl thiamine | $-CO-CH_3$ | $-CO-CH_3$ |
| S-benzoyl-thiamine O-monophosphate | $-CO-CH_3$ | $-\overset{\mid}{\underset{\mid}{P}}-OH$ $\overset{\mid}{OH}$ |
| O,S-dicarboethoxy-thiamine | $-COOC_2H_5$ | $-COOC_2H_5$ |
| O,S-cyclocarbo thiamine | $-R_1$ $\diagdown R_2$ | $\diagdown C=O$ $\diagup$ |

As the bisthiamine-disulfide derivatives there may be enumerated the following compounds.

BISTHIAMINE-DISULFIDE DERIVATIVES

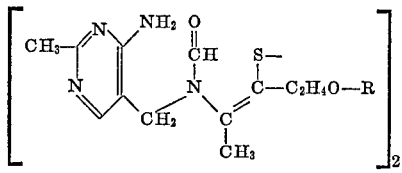

| Compounds | R |
|---|---|
| Thiamine-disulfide | H |
| O-benzoylthiamine-disulfide | $-CO-\langle\rangle$ |

The said thiol-type thiamine derivatives may be employed as free compounds or corresponding salts with a suitable acid such as hydrochloric acid and nitric acid. In the method of the present invention one compound or a mixture of more than one of these thiol-type thiamine derivatives is added to the semen preparation for artificial insemination. From the viewpoint of effect of heightening and maintaining the livability and motility of the spermatozoa in the semen preparation, the thiol-type thiamine is generally used in such an amount as about 0.001 to about 0.1 weight percent preferably about 0.006 to about 0.01 weight percent relative to the total volume of the semen preparation.

The semen preparation to be incorporated with the thiol-type thiamine derivative may be any of the conventional semen preparations for artificial insemination of livestock. That is to say, according to the method of the present invention, either the diluted semen in the above-mentioned liquid semen method or the thawed semen obtained by thawing the frozen semen in the above-mentioned deep freezing method can be heightened and maintained high in the livability and motility of the spermatozoa. And such effect of heightening and maintaining the livability and motility of the spermatozoa can be attained by adding a thiol-type thiamine derivative to any conventional semen preparation before the use. In a case of the diluted semen in the liquid semen method, the thiol-type thiamine derivative may be added to the semen diluter with which the semen is diluted, to the diluted semen just after the dilution, or to the diluted semen under the storage at about 4° C. In a case of the thawed semen in the deep freezing method, the thiol-type thiamine derivative may be added to the semen in any of the steps of the second dilution, of the glycerin equilibrium and of the storage at about 4° C. after thawing. Most practically, the object of the present invention can be attained by diluting the semen with a semen diluter containing the thiol-type thiamine derivative, which is prepared by adding the derivative to any of hitherto known diluters. In this case, the concentration of the thiol-type thiamine in the semen diluter is preferably about 0.001 to 0.1 weight percent, most preferably about 0.006 to 0.01 weight percent relative to the volume of the diluter.

As the semen diluter to be employed in the present invention may be any of the ordinary diluter known in the current art. In general, the diluters may comprise, as a basal component, egg yolk, egg product such as lecithin, milk or milk product such as defatted milk or caesin, and additionally may contain inorganic and organic buffering salts, energy sources such as fructose and amino acid, all of which are familiar in the veterinary and animal husbandry art, and are commonly chosen depending upon the factors such as kind of the livestock. As the examples of such semen diluter there may be enumerated an egg yolk diluter such as egg yolk citrate buffer solution, egg yolk phosphate buffer solution, a milk diluter which is prepared by heating whole milk or skim milk.

Thus prepared semen preparation containing the thiol-type thiamine derivative is very high in the livability and motility of the spermatozoa therein and therefore the fertilizing capacity of the spermatozoa in the semen preparation can persist after many days of storage.

The following examples are merely intended to illustrate presently preferred embodiments of the methods and compositions of the present invention and not to restrict the scope of the latter.

Throughout the present specification as well as in the following examples, the abbreviations ml. and ° C. respectively refer to milliliters and degrees centigrade, and percentages are weight/volume unless otherwise described:

In the following examples, the livability and the motility of spermatozoa is shown by the following references:

+++—Spermatozoa with very actively progressive motion.
++—Spermatozoa with actively progressive motion.
+—Spermatozoa with progressive motion.
±—Rotative or pendulum-like motile spermatozoa.
+++~++—Spermatozoa with the middle motion between said +++ and ++.
++~+—Spermatozoa with the middle motion between said ++ and +.
+~±—Spermatozoa with the middle motion between said + and ±.

Percentages which are described in front of said references mean percentage of spermatozoa with such motion to all spermatozoa in the semen preparation. For example, $$85+++$$
$$5++$$

means that percentage of spermatozoa with very actively progressive motion and percentage of spermatozoa with actively progressive motion to all spermatozoa in the semen preparation are 85 and 5 respectively.

And the livability indexes of spermatozoa in the semen preparation are shown in the numerals calculated from the following formula.

$$\text{Livability index} = \frac{100a + 75b + 50c + 25d}{100}$$

0.0020000% of thiamine propyl disulfide. Each of the diluted semen samples is cooled to 4° C. and stored at even temperature for 7 days. The livability and motility of the spermatozoa in one drop of each of the diluted semen samples is examined microscopically at about 4° C. The results are shown in the following Table 1.

TABLE 1

| Bulls | Concentration of thiamine propyl disulfide in the semen diluter (percent) | Immediately after the dilution | Storage period (days) | | | | | | |
|---|---|---|---|---|---|---|---|---|---|
| | | | 1 | 2 | 3 | 4 | 5 | 6 | 7 |
| A | 0.0156250 | 85+++ 5+ | 80+++ 5+ | 75+++ 5+ | 70+++ 5+ | 65+++ 5+ | 65+++~++ 5+ | 50+++~++ 5+ | 30++~+ 5+ |
| | 0.0078125 | 80+++ 5+ | 80+++ 5+ | 75+++ 5+ | 65+++ 5+ | 65+++ 5+ | 60+++~++ 5+ | 50+++~++ 5+ | 40++ 10+ |
| | 0.0020000 | 75+++ 5+ | 70+++ 5+ | 65+++ 5+ | 55+++ 5+ | 50+++~++ 5+ | 40++~+ 5+ | 40++~+ 5+ | 30+ 5± |
| | 0 (Control) | 70+++ 5+ | 70+++ 10+ | 70+++ 5+ | 55+++ 5+ | 50+++ 5+ | 40+++~++ 5+ | 40++ 10+ | 30++~+ 5+ |
| B | 0.0156250 | 85+++ | 80+++ 5+ | 75+++ 5+ | 75+++ 5+ | 50+++~++ 5+ | 40++~+ 5+ | 20+~± | et* |
| | 0.0078125 | 85+++ 5+ | 80+++ 5+ | 75+++ 5+ | 70+++ 5+ | 65+++ 5+ | 60+++ 10+ | 50+++~++ 5+ | 40++ 5+ |
| | 0.0020000 | 70+++ 5+ | 70+++ 5+ | 70+++ 5+ | 55+++ 5+ | 40++ 5+ | 30+ 10± | 20+ 10± | 20± |
| | 0 (Control) | 70+++ 5+ | 70+++ 10 | 70+++ 5+ | 50+++ 5+ | 40+++~++ 5+ | 30++~+ 10± | 30+~± | 20± | et*=Motile but unnumbered.

wherein a.—Percentage of +++ to all spermatozoa in the semen preparation.
b.—Percentage of ++.
c.—Percentage of +.
d.—Percentage of ±.

Example 1

Bovine semen collected from 2 bulls is diluted 10-fold at the body temperature with an egg yolk citrate buffer solution containing 2.4% of sodium citrate and 20% of fresh yolk and with the semen diluters of the present invention prepared by supplementing the said egg citrate buffer solution with 0.015250%, 0.0078125% or Example 2

Bovine semen collected from one bull is diluted 10-fold at the body temperature with an egg yolk citrate buffer solution containing 2.4% of sodium citrate and 20% of fresh yolk. The diluted semen is stored at 4° C. After two days storage, thiamine tetrahydrofurfuryl disulfide, thiamine tetrahydrofurfuryl disulfide hydrochloride, thiamine propyl disulfide and thiamine propyl disulfide hydrochloride is added to the diluted semen in a final concentration of 1%, 0.5% or 0.125%.

The diluted semen is further stored at 4° C. for 5 days. Throughout the period of the storage, the livability and motility of spermatozoa in the diluted semen is examined microscopically. The results are shown in the following Table 2.

TABLE 2

| Thio-type thiamine derivatives | Concentration (percent) | Immediately after the dilution | Storage period (days) | | | | | | | |
|---|---|---|---|---|---|---|---|---|---|---|
| | | | 1 | 2 | | 3 | 4 | 5 | 6 | 7 |
| | | | | Before the addition | Immediately after the addition | | | | | |
| TTFD¹ | 1.0000 | 85+++ | 80+++ | 70+++ 5+ | 85+++ | 0 | | | | |
| | 0.5000 | 85+++ | 80+++ | 70+++ 5+ | 85+++ | 20+~+ | 0 | | | |
| | 0.0625 | 85+++ | 80+++ | 70+++ 5+ | 75+++ | 80+++ 5+ | 70+++ 5+ | 55+++~++ 5+ | 40++~+ 5+ | 35++~+ 5+ |

TABLE 2—Continued

| Thio-type thiamine derivatives | Concentration (percent) | Storage period (days) | | | | | | | | |
|---|---|---|---|---|---|---|---|---|---|---|
| | | Immediately after the dilution | 1 | 2 | | 3 | 4 | 5 | 6 | 7 |
| | | | | Before the addition | Immediately after the addition | | | | | |
| TTFD¹ hydrochloride. | 1.0000 | 85+++ | 80+++ | 70+++ 5+ | 85+++ | et* | 0 | | | |
| | 0.5000 | 85+++ | 80+++ | 70+++ 5+ | 80+++ | 30+~+ | 0 | | | |
| | 0.0625 | 85+++ | 80+++ | 70+++ 5+ | 75+++ 5+ | 75+++ 5+ | 60+++ 10+ | 40+~+ 10+ | 40+~+ 5+ | 35++~+ 5+ |
| TPD² | 1.0000 | 85+++ | 80+++ | 70+++ 5+ | 90+++ | 0 | | | | |
| | 0.5000 | 85+++ | 80+++ | 70+++ 5+ | 85+++ | 10± | 0 | | | |
| | 0.0625 | 85+++ | 80+++ | 70+++ 5+ | 80+++ | 90++ | 75+++ 5+ | 70+++ 10+ | 60+++~++ 5+ | 50+++~+ 5+ |
| TPD² hydrochloride. | 1.0000 | 85+++ | 80+++ | 70+++ 5+ | 85+++ | 0 | | | | |
| | 0.5000 | 85+++ | 80+++ | 70+++ 5+ | 80+++ 5+ | 10+~± | 0 | | | |
| | 0.0625 | 85+++ | 80+++ | 70+++ 5+ | 75+++ 5+ | 90+++ | 75+++ 5+ | 70+++ 5+ | 65+++ 5+ | 60+++ 5+ |
| Control A | 0 | 85+++ | 80+++ | 70+++ 5+ | 70+++ 5+ | 70+++ 5+ | 60+++~++ 5+ | 45++~+ 5+ | 40++ 5+ | 40+ 5± |
| Control B | 0 | 85+++ | 80+++ | 70+++ 5+ | 70+++ 5+ | 70+++ 5+ | 50+++~++ 10+ | 45++~+ 5+ | 40+ 5± | 20+~± |

¹TTFD = thiamine tetrahydrofurfuryl disulfide. ² TPD = thiamine propyl disulfide;

Example 3

Bovine semen collected from one bull is diluted 10-fold at the body temperature with an egg yolk citrate buffer solution containing 2.4% of sodium citrate and 20% of fresh yolk. The diluted semen is stored at 4° C. After four days storage, thiamine tetrahydrofurfuryl disulfide, thiamine tetrahydrofurfuryl disulfide hydrochloride, thiamine propyl disulfide and thiamine propyl disulfide hydrochloride are added to the diluted semen in concentrations described in the following Table 3. The diluted semen is further stored at 4° C. for 3 days. Throughout the period of the storage, the livability and motility of spermatozoa in the diluted semen is examined microscopically. The results are shown in the following Table 3.

TABLE 3

| Thiol-type derivatives | Concentration of test compounds in the diluted semen (percent) | Storage period (days) | | | | | | | | |
|---|---|---|---|---|---|---|---|---|---|---|
| | | Immediately after the dilution | 1 | 2 | 3 | 4 | | 5 | 6 | 7 |
| | | | | | | Before the addition of test compounds | Immediately after the addition of test compounds | | | |
| TTFD¹ | 0.062500 | 85+++ | 85+++ | 75+++ | 65+++ | 60+++ 5+ | 65+++ 5+ | 75+++ 5+ | 75+++ | 60+++~++ 5+ |
| | 0.031250 | 85+++ | 85+++ | 75+++ | 65+++ | 60+++ 5+ | 60+++ 10+ | 70+++ 5+ | 65+++~++ 5+ | 65+++~++ 5+ |
| | 0.015625 | 85+++ | 85+++ | 75+++ | 65+++ | 60+++ 5+ | 60+++ 10+ | 60+++~++ 10+ | 55+++~++ 5+ | 55++ 5 |

TABLE 3—Continued

| Thiol-type derivatives | Concentration of test compounds in the diluted semen (percent) | Storage period (days) | | | | | | | | |
|---|---|---|---|---|---|---|---|---|---|---|
| | | Immediately after the dilution | 1 | 2 | 3 | 4 | | 5 | 6 | 7 |
| | | | | | | Before the addition of test compounds | Immediately after the addition of test compounds | | | |
| TTFD¹ hydrochloride | 0.125000 | 85+++ | 85+++ | 75+++ | 65+++ | 60+++ 5+ | 70+++ 5+ | 80+++ 5+ | 40+ 5+ | 0 |
| | 0.062500 | 85+++ | 85+++ | 75+++ | 65+++ | 60+++ 5+ | 65+++ 5+ | 75+++ 5+ | 75+++ | 70+++~++ 5+ |
| | 0.031250 | 85+++ | 85+++ | 75+++ | 65+++ | 60+++ 5+ | 65+++ 5+ | 65+++ 5+ | 60+++ 5+ | 60+++~++ 5+ |
| | 0.015625 | 85+++ | 85+++ | 75+++ | 65+++ | 60+++ 5+ | 60+++ 5+ | 60+++ 10+ | 60+++ 5+ | 60+++~++ 5+ |
| TPD² | 0.062500 | 85+++ | 85+++ | 75+++ | 65+++ | 60+++ 5+ | 65+++ 5+ | 80+++ 5+ | 75+++ | 65+++~++ 5+ |
| | 0.031250 | 85+++ | 85+++ | 75+++ | 65+++ | 60+++ 5+ | 65+++ 5+ | 70+++ 5+ | 70+++ 5+ | 70+++~++ 5+ |
| | 0.015625 | 85+++ | 85+++ | 75+++ | 65+++ | 60+++ 5+ | 60+++ 5+ | 65+++~++ 5+ | 60+++~++ 5+ | 50++ 5+ |
| TPD² hydrochloride | 0.062500 | 85+++ | 85+++ | 75+++ | 65+++ | 60+++ 5+ | 65+++ 5+ | 80+++ 5+ | 80+++ | 75+++ |
| | 0.031250 | 85+++ | 85+++ | 75+++ | 65+++ | 60+++ 5+ | 60+++ 10+ | 70+++ 5+ | 65+++ 10+ | 60+++~++ 5+ |
| | 0.015625 | 85+++ | 85+++ | 75+++ | 65+++ | 60+++ 5+ | 60+++ 5+ | 60+++~++ 5+ | 55+++~++ 5+ | 50++ 10+ |
| Control A | 0 | | | | | | 60+++ 5+ | 50+++~++ 10+ | 50++ 5+ | 50++~+ 5+ |
| Control B | 0 | 85+++ | 85+++ | 75+++ | 65+++ | 60+++ 5+ | 60+++ 5+ | 50+++~++ 10+ | 50++ 5+ | 50++~+ 5+ |

¹ TTFD = thiamine tetrahydrofurfuryl disulfide.   ² TPD = thiamine propyl disulfide.

Example 4

Goat semen collected from one sire is diluted 5-fold at the body temperature with a physiological saline solution and the mixture is subjected to centrifugation to get rid of seminal plasma. After decanting the supernatant, sedimenting spermatozoa is resuspended into an egg yolk citrate buffer solution containing 2.4% of sodium citrate and 20% of fresh yolk in the same volume as the original semen.

The resulting semen is diluted 10-fold at the body temperature with an egg yolk citrate buffer solution of the same composition as described above. The diluted is stored at 4° C. After two days storage, thiamine tetrahydrofurfuryl disulfide, thiamine tetrahydrofurfuryl disulfide hydrochloride, thiamine propyl disulfide and thiamine propyl disulfide hydrochloride are added to the diluted semen in concentrations described in the following Table 4. The dilute semen is further stored at 4° C. for 5 days. Throughout the period of the storage, the livability and motility of the spermatozoa in the diluted semen is examined microscopically. The results are shown in the following Table 4.

TABLE 4

| Thiol-type thiamine derivatives | Concentration of test compounds in the diluted semen (percent) | Storage period (days) | | | | | | | |
|---|---|---|---|---|---|---|---|---|---|
| | | 1 | 2 | | 3 | 4 | 5 | 6 | 7 |
| | | | Before the addition of test compounds | Immediately after the addition of test compounds | | | | | |
| TTFD¹ | 1.0000 | 55+++ 5+ | 50+++ 5+ | 75+++ 5+ | 0 | 0 | 0 | 0 | 0 |
| | 0.5000 | 55+++ 5+ | 50+++ 5+ | 75+++ 5+ | 0 | 0 | 0 | 0 | 0 |
| | 0.0625 | 55+++ 5+ | 50+++ 5+ | 60+++ 5+ | 65+++ 5+ | 60+++~++ 5+ | 55+++~++ 5+ | 45++ 5+ | 25++ 10+ |

TABLE 4—Continued

| Thiol-type thiamine derivatives | Concentration of test compounds in the diluted semen (percent) | Storage period (days) | | | | | | | |
|---|---|---|---|---|---|---|---|---|---|
| | | 1 | 2 Before the addition of test compounds | 2 Immediately after the addition of test compounds | 3 | 4 | 5 | 6 | 7 |
| TPD² | 1.0000 | 55+++ 5+ | 50+++ 5+ | 75+++ 5+ | 0 | 0 | 0 | 0 | 0 |
| | 0.5000 | 55+++ 5+ | 50+++ 5+ | 75+++ 5+ | 0 | 0 | 0 | 0 | 0 |
| | 0.0625 | 55+++ 5+ | 50+++ 5+ | 60+++ 5+ | 75+++ 5+.. | 70+++ 5+ | 65+++ 5+ | 60+++~++ 5+ | 55+++~++ 5+ |
| TPD² hydrochloride. | 1.0000 | 55+++ 5+ | 50+++ 5+ | 75+++ 5+ | 0 | 0 | 0 | 0 | 0 |
| | 0.5000 | 55+++ 5+ | 50+++ 5+ | 75+++ 5+ | | 0 | 0 | 0 | 0 |
| | 0.0625 | 55+++ 5+ | 50+++ 5+ | 60+++ 5+ | 75+++ 5+ | 70+++ 5+ | 65+++ 5+ | 60+++~++ 5+ | 50+++~++ 5+ |
| Control A | 0 | 55+++ 5+ | 50+++ 5+ | 50+++ 5+ | 45+++~++ 5+ | 40+++ 5+ | 35+++ 5+ | 30+++ 5+ | 20++~+ 5+ |
| Control B | 0 | 55+++ 5+ | 50+++ 5+ | 50+++ 5+ | 45+++~++ 5+ | 40++ 5+ | 35++ 5+ | 30++ 5+ | 20++~+ 5+ |

¹ TTFD=thiamine tetrahydrofurfuryl disulfide.   ² TPD=thiamine propyl disulfide.

Example 5

Bovine semen collected from 3 bulls is diluted 10-fold at the body temperature with a milk dilutor which is prepared by heating fresh milk at 92° C. for 10 minutes to inactivate harmful materials to spermatozoan livability sub-

TABLE 5

| Bulls | Concentration of thiamine propyl disulfide hydrochloride in the diluted semen (percent) | Storage time (days) | | | | | | | |
|---|---|---|---|---|---|---|---|---|---|
| | | 0 | 1 | 2 | 3 | 4 | 5 | 6 | 7 |
| A | 0 (Control) | 60+++ 5+ | 50+++~++ 10+ | 40+++~++ 5+ | 40+++~++ 5+ | 35++ 5+ | 20++~+ 5+ | 15+~± | 0 |
| | 0.00313 | 65+++ 5+ | 60+++ 5+ | 50+++~++ 5+ | 40+++~++ 5+ | 40++ 5+ | 10+ 10± | 5± | 0 |
| | 0.00156 | 65+++ 5+ | 55+++ 10+ | 50+++~++ 5+ | 45+++~++ 5+ | 35++ 5+ | 15+~+ | 5± | 0 |
| B | 0 (Control) | 65+++ 5+ | 60+++ 5+ | 40+++~++ 10+ | 40+++~++ 10+ | 30++ 5+ | 25++ 10+ | 20++~+ 10+ | 20+~± |
| | 0.00313 | 70+++ 5+ | 65+++ 5+ | 55+++ 10+ | 50+++ 10+ | 40+++~++ 5+ | 25++ 10+ | 15+~+ 10+ | et* ± |
| | 0.00156 | 70+++ 5+ | 60+++ 10+ | 55+++ 5+ | 50+++~++ 10+ | 30++ 5+ | 25++ 5+ | 20++~+ 5+ | et* ± |
| C | 0 (Control) | 70+++ 5+ | 60+++ 5+ | 50+++ 5+ | 40++ 5+ | 20++~+ 10+ | 10+ 10+ | et* ± | 0 |
| | 0.00313 | 70+++ 5+ | 65+++ 5+ | 60+++ 5+ | 50+++ 5+ | 30++ 10+ | 15++ 5± | 10+~± | et* ± |
| | 0.00156 | 70+++ 5+ | 65+++ 5+ | 60+++ 5+ | 45+++~++ +5 | 30++ 10+ | 20±~+ 5± | 15+~+ | et* ± | et*=Motile but unnumbered.

sequently removing therefrom milk fat by centrifugation for 30 minutes at 3000 r.p.m. To the diluted semen is added thiamine propyl disulfide hydrochloride in concentrations of 0.00313% and 0.00156%. Each of the diluted semen is stored at 4° C. for 7 days. The livability and motility of spermatozoa in the diluted semen is examined microscopically. The results are shown in Table 5.

arter the manner described in Example 5. The diluted semen is stored at 4° C. After two days storage, thiamine propyl disulfide hydrochloride is added to the diluted solution in concentration of 0.01250%, 0.00625%, 0.00313% and 0.00156%. Each of diluted semen samples is further stored at 4° C. for 5 days. The livability and motility of spermatozoa in the respective diluted semen samples is shown in the following Table 6.

TABLE 6

| Bulls | Concentration of thiamine propyl disulfide hydrochloride in the diluted semen (percent) | Storage period (days) | | | | | | | | |
|---|---|---|---|---|---|---|---|---|---|---|
| | | 0 | 1 | 2 | | 3 | 4 | 5 | 6 | 7 |
| | | | | Before the addition | Immediately after the addition | | | | | |
| A | 0 (Control) | 70+++ 5+ | 60+++ 5+ | 55+++ 5+ | 55+++ 5+ | 55+++ 5+ | 50+++~++ 5+ | 40+++~++ 10+ | 30++ 10+ | 20++~+ 5± |
| | 0.00313 | 70+++ 5+ | 60+++ 5+ | 55+++ 5+ | 55+++ 5+ | 70+++ 5+ | 60+++ 5+ | 45+++~++ 10+ | 20++~+ 10+ | 20++~+ 5± |
| | 0.00156 | 70+++ 5+ | 60+++ 5+ | 55+++ 5+ | 55+++ 5+ | 70+++ 5+ | 50+++ 10+ | 40+++~++ 10+ | 20++ 10+ | 10+ 10± |
| B | 0 (Control) | 60+++ 5+ | 55+++ 5+ | 50+++ 10+ | 50+++ 10+ | 45+++~++ 5+ | 30++ 5+ | 20++~+ 10+ | 20++~+ 5± | 20++~+ 5± |
| | 0.00313 | 60+++ 5+ | 55+++ 5+ | 50+++ 10+ | 55+++ 5+ | 55+++ 5+ | 55+++~++ 10+ | 35++ 10+ | 20++~+ 10+ | 20++~+ 5± |
| | 0.00156 | 60+++ 5+++ | 55+++ 5+++ | 50+++ 10+ | 50+++ 10+ | 55+++ 5+ | 40+++~++ 10+ | 40++ 5+ | 30+++~+ 5+ | 20++~+ 10+ |
| C | 0 (Control) | 70+++ 5+ | 60+++ 5+ | 45+++~++ 10+ | 45+++~++ 10+ | 40+++~++ 10+ | 40+++~++ 5+ | 30++ 10+ | 25++~+ 10+ | 15+++~+ 10± |
| | 0.00313 | 70+++ 5+ | 60+++ 5+ | 45+++~++ 10+ | 45+++~++ 10+ | 60+++ 10+ | 55+++ 5+ | 25++~+ 5+ | 15++~+ 10+ | 10+ 10± |
| | 0.00156 | 70+++ 5+ | 60+++ 5+ | 45+++~++ 10+ | 45+++~++ 10+ | 60+++ 5+ | 40+++~++ 10+ | 20++~+ 10+ | 20++~+ 10± | 10+ 10± |

Example 6

Bovine semen collected from 3 bulls is diluted 10-fold at the body temperature with a milk dilutor prepared

Example 7

Bovine semen collected from 2 bulls is diluted 10-fold at the body temperature with a milk diluter prepared

TABLE 7

| Bulls | Concentration of thiamine propyl disulfide hydrochloride added in the diluted semen (percent) | Storage period (days) | | | | | | | | |
|---|---|---|---|---|---|---|---|---|---|---|
| | | 0 | 1 | 2 | 3 | 4 | | 5 | 6 | 7 |
| | | | | | | Before the addition | Immediately after the addition | | | |
| A | 0 (Control) | 70+++ 5+ | 60+++ 5+ | 45+++~++ 10+ | 40+++~++ 10+ | 40+++~++ 5+ | 40+++~++ 5+ | 40+++~++ 5+ | 20++~+ 10± | 10+ 10± |
| | 0.00313 | 70+++ 5+ | 60+++ 5+ | 45+++~++ 10+ | 40+++~+ 10+ | 40+++~++ 5+ | 40+++~++ 5+ | 40+++~++ 10+ | 25++ 10+ | 10++~+ 10± |
| | 0.00156 | 70+++ 5+ | 60+++ 5+ | 45+++~++ 10+ | 40+++~++ 10+ | 40+++~++ 5+ | 40+++~++ 5+ | 40+++~++ 5+ | 30++ 5+ | 20++~+ 5± |
| B | 0 (Control) | 70+++ 5+ | 60+++ 5+ | 50+++ 10+ | 50+++ 5+ | 50+++ 5+ | 50+++ 5+ | 45+++~++ 5+ | 40+++~++ 5+ | 30++ 5+ |
| | 0.00313 | 70+++ 5+ | 60+++ 5+ | 50+++ 10+ | 50+++ 5+ | 50+++ 5+ | 50+++ 5+ | 50+++ 10+ | 40+++~++ 5+ | 30++ 5+ |
| | 0.00156 | 70+++ 5+ | 60+++ 5+ | 50+++ 10+ | 50+++ 5+ | 50+++ 5+ | 50+++ 5+ | 50+++ 10+ | 40+++~++ 5+ | 30++ 5+ | after the manner described in Example 5. The diluted semen is stored at 4° C. After four days storage, thiamine propyl disulfide hydrochloride is added to the diluted solution in concentrations of 0.00313% and 0.00156%. Each of the diluted semen samples is further stored at 4° C. for 3 days. The livability and motility of spermatozoa in the respective diluted semen samples is shown in Table 7.

of the livability index of the respective thawed semen samples is shown in the following Table 8.

TABLE 8

| Bulls | Thiol-type thiamine derivatives | Concentration of test compound in the thawed semen | Livability index | | | | | |
|---|---|---|---|---|---|---|---|---|
| | | | Before the refrigeration | | After thawing | | | |
| | | | Before the addition of test compounds | Just after the addition of test compounds | Just after thawing | 4 hrs. after thawing | 12 hrs. after thawing | 24 hrs. after thawing |
| A | Thiamine propyl disulfide | 0.04545 | 75.0 | 80.0 | 62.5 | 57.5 | 52.9 | 33.3 |
| | | 0.02270 | 75.0 | 75.0 | 62.5 | 62.5 | 52.9 | 48.3 |
| | | 0.01136 | 75.0 | 75.0 | 67.5 | 67.5 | 62.5 | 48.3 |
| | | 0.00568 | 75.0 | 75.0 | 67.5 | 67.5 | 62.5 | 52.9 |
| | | 0.00284 | 75.0 | 75.0 | 57.5 | 57.5 | 52.9 | 48.3 |
| | | 0.00142 | 75.0 | 75.0 | 57.5 | 57.5 | 48.3 | 48.3 |
| | Thiamine propyl disulfide hydrochloride | 0.04545 | 75.0 | 80.0 | 62.5 | 52.9 | 52.9 | 35.8 |
| | | 0.02270 | 75.0 | 75.0 | 62.5 | 52.9 | 52.9 | 44.2 |
| | | 0.01136 | 75.0 | 75.0 | 62.5 | 62.5 | 62.5 | 48.3 |
| | | 0.00568 | 75.0 | 75.0 | 62.5 | 62.5 | 57.5 | 43.8 |
| | | 0.00284 | 75.0 | 75.0 | 62.5 | 57.5 | 52.9 | 48.3 |
| | | 0.00142 | 75.0 | 75.0 | 57.5 | 57.5 | 52.9 | 48.3 |
| | Control | 0 | 75.0 | | 57.5 | 52.9 | 40.0 | 33.3 |
| B | Thiamine propyldisulfide | 0.04545 | 80.0 | 80.0 | 62.5 | 62.5 | 52.9 | 48.3 |
| | | 0.02270 | 80.0 | 80.0 | 62.5 | 67.5 | 62.5 | 52.9 |
| | | 0.001136 | 80.0 | 80.0 | 62.5 | 67.5 | 67.5 | 62.5 |
| | | 0.00568 | 80.0 | 80.0 | 57.5 | 67.5 | 67.5 | 62.5 |
| | | 0.00284 | 80.0 | 80.0 | 57.5 | 52.9 | 62.5 | 52.9 |
| | | 0.00142 | 80.0 | 80.0 | 57.5 | 52.9 | 52.9 | 52.9 |
| | Thiamine propyl disulfide hydrochloride | 0.04545 | 80.0 | 80.0 | 62.5 | 67.5 | 48.3 | 48.3 |
| | | 0.02270 | 80.0 | 80.0 | 62.5 | 87.5 | 62.5 | 48.3 |
| | | 0.01136 | 80.0 | 80.0 | 62.5 | 67.5 | 67.5 | 57.5 |
| | | 0.00568 | 80.0 | 80.0 | 57.5 | 62.5 | 62.5 | 57.5 |
| | | 0.00284 | 80.0 | 80.0 | 57.5 | 52.9 | 57.9 | 52.5 |
| | | 0.00142 | 80.0 | 80.0 | 57.5 | 52.9 | 52.9 | 50.4 |
| | Control | 0 | 80.0 | | 57.5 | 52.9 | 52.9 | 30.4 |

Example 8

Bovine semen collected from 2 bulls is diluted 5-fold at the body temperature with an egg yolk citrate buffer solution containing 2.4% of sodium citrate and 20% of fresh yolk, and the resulting diluted semen is cooled to 4° C. gradually for 1 hour. The diluted semen is further diluted 2-fold at 4° C. with an egg yolk citrate buffer solution containing 2.4% of sodium citrate, 20% of fresh yolk and 14.0% of glycerin. To the resultant diluted semen are added thiamine propyl disulfide and thiamine propyl disulfide hydrochloride in concentrations described in the following Table 8. And then the diluted semen is kept standing at 4° C. for 10 hours. 1 ml. each of the diluted semen samples is put into ampoules of 2 ml. capacity and the ampoules are closed. After being frozen and stored in a liquid-nitrogen refrigerator at −196° C. for 3 days, each of the ampouled samples is thawed at 4° C. and stored at even temperature for 24 hours. The change Example 9

Goat semen collected from 2 sires is diluted 5-fold at the body temperature with a physiological saline solution and the resultant mixture is subjected to centrifugation to get rid of seminal plasma. After decanting the supernatant, sedimenting spermatozoa is resuspended into an egg yolk citrate buffer solution containing 2.4% of sodium citrate and 20% of fresh yolk in the same volume as the original semen. The resultant semen is diluted 5-fold at the body temperature with an egg yolk citrate buffer solution of the same composition as described above. After being cooled to 4° C. gradually for 1 hour, the diluted semen is further diluted 2-fold with an egg yolk citrate buffer solution containing 2.4% of sodium citrate and 20% of fresh yolk, 14% of glycerin. To the resultant diluted semen are added thiamine propyl disulfide and thiamine propyl disulfide hydrochloride in concentrations described in the following Table 9. And then the diluted semen is kept standing at 4° C. for 10 hours. 1 ml. each of the diluted semen samples is put into ampoules of 2 ml. capacity and the ampoules are closed. After being frozen and stored in Dry Ice refrigerator at −79° C. for 3 days, each of the ampouled samples are thawed at 4° C. and stored at even temperature for 24 hours. The change of livability index of the respective thawed semen samples is shown in the following Table 9.

TABLE 9

| Bulls | Thiol-type thiamine derivatives | Concentration of test compound in the thawed semen | Livability index | | | | | |
|---|---|---|---|---|---|---|---|---|
| | | | Before the refrigeration | | After thawing | | | |
| | | | Before the addition of test compounds | Just after the addition of test compounds | Just after thawing | 4 hrs. after thawing | 12 hrs. after thawing | 24 hrs. after thawing |
| A | Thiamine propyl disulfide | 0.02270 | 80.0 | 85.0 | 57.5 | 57.5 | 62.5 | 30.0 |
| | | 0.01136 | 80.0 | 80.0 | 52.5 | 57.5 | 67.5 | 48.3 |
| | | 0.00568 | 80.0 | 80.0 | 39.2 | 52.4 | 62.5 | 57.5 |
| | | 0.00284 | 80.0 | 80.0 | 39.2 | 47.5 | 48.3 | 48.3 |
| | | 0.00142 | 80.0 | 80.0 | 34.6 | 39.2 | 33.3 | 30.0 |
| | Thiamine propyldisulfide hydrochloride | 0.02270 | 80.0 | 85.0 | 57.5 | 57.5 | 57.5 | 20.4 |
| | | 0.001136 | 80.0 | 80.0 | 43.7 | 57.5 | 57.5 | 48.3 |
| | | 0.00568 | 80.0 | 80.0 | 43.7 | 52.5 | 57.5 | 57.5 |
| | | 0.00284 | 80.0 | 80.0 | 43.7 | 43.7 | 31.7 | 28.8 |
| | | 0.00142 | 80.0 | 80.0 | 43.7 | 43.7 | 31.7 | 36.3 |
| | Control | 0 | 80.0 | 80.0 | 31.7 | 31.7 | 31.7 | 17.5 |
| B | Thiamine propyldisulfide | 0.02270 | 80.0 | 80.0 | 62.5 | 62.5 | 62.5 | 30.0 |
| | | 0.01136 | 80.0 | 80.0 | 57.5 | 57.5 | 62.5 | 57.5 |
| | | 0.00568 | 80.0 | 80.0 | 52.9 | 52.9 | 52.9 | 44.2 |
| | | 0.00284 | 80.0 | 80.0 | 52.9 | 52.9 | 52.9 | 44.2 |
| | | 0.00142 | 80.0 | 80.0 | 52.9 | 52.9 | 48.3 | 30.0 |
| | Thiamine propyldisulfide hydrochloride | 0.02270 | 80.0 | 80.0 | 57.5 | 62.5 | 62.5 | 44.2 |
| | | 0.01136 | 80.0 | 80.0 | 57.5 | 62.5 | 62.5 | 57.5 |
| | | 0.00568 | 80.0 | 80.0 | 57.5 | 62.5 | 62.5 | 57.5 |
| | | 0.00284 | 80.0 | 80.0 | 57.5 | 52.9 | 52.9 | 44.2 |
| | | 0.00142 | 80.0 | 80.0 | 57.5 | 52.9 | 48.3 | 30.0 |
| | Control | 0 | 80.0 | 80.0 | 52.9 | 52.9 | 40.0 | 26.7 |

Example 10

Bovine semen collected from 2 bulls is diluted 5-fold at the body temperature with an egg yolk citrate buffer solution containing 2.4% of sodium citrate and 20% of fresh yolk, and the resulting diluted semen is cooled to 4° C. gradually for 1 hour. The diluted semen is further diluted 2-fold at 4° C. with an egg yolk citrate buffer solution containing 2.4% of sodium citrate, 20% buffer yolk and 14% of glycerin. After being kept standing at 4° C. for 10 hours, the diluted semen samples is put into ampoules and the ampoules are closed. After being frozen and stored in a liquid-nitrogen refrigerator at −196° C. for 3 days, each of the ampouled samples is thawed at 4° C. To the thawed semen samples are added

TABLE 10

| Bulls | Thiol-type thiamine derivatives | Concentration of tests compounds in the thawed semen | Livability index | | | | | |
|---|---|---|---|---|---|---|---|---|
| | | | Before the refrigeration | After thawing | | | | |
| | | | | Just after thawing | Just after after the addition | 4 hrs. after the addition | 12 hrs. after the addition | 24 hrs. after the addition |
| A | Thiamine propyl disulfide | 0.04545 | 80.0 | 52.9 | 62.5 | 62.5 | 52.9 | 40.4 |
| | | 0.02270 | 80.0 | 52.9 | 62.5 | 62.5 | 52.9 | 52.9 |
| | | 0.01136 | 80.0 | 52.9 | 62.5 | 67.5 | 52.9 | 52.9 |
| | | 0.00568 | 80.0 | 52.9 | 62.5 | 62.5 | 62.5 | 57.5 |
| | | 0.00284 | 80.0 | 52.9 | 57.5 | 57.5 | 52.9 | 48.3 |
| | | 0.00142 | 80.0 | 52.9 | 57.5 | 57.5 | 40.0 | 40.0 |
| | Thiamine propyl disulfide hydrochloride | 0.04545 | 80.0 | 52.9 | 62.5 | 67.5 | 57.5 | 40.4 |
| | | 0.02270 | 80.0 | 52.9 | 62.5 | 67.5 | 57.5 | 48.3 |
| | | 0.01136 | 80.0 | 52.9 | 62.5 | 72.5 | 62.5 | 48.3 |
| | | 0.00568 | 80.0 | 52.9 | 57.5 | 62.5 | 62.5 | 57.5 |
| | | 0.00284 | 80.0 | 52.9 | 57.5 | 57.5 | 57.5 | 52.9 |
| | | 0.00142 | 80.0 | 52.9 | 57.5 | 57.5 | 48.3 | 43.7 |
| | Control | 0 | 80.0 | 52.9 | 52.9 | 52.9 | 35.8 | 35.8 |

TABLE 10—Continued

| Bulls | Thiol-type thiamine derivatives | Concentration of tests compounds in the thawed semen | Livability index | | | | | |
|---|---|---|---|---|---|---|---|---|
| | | | Before the refrigeration | After thawing | | | | |
| | | | | Just after thawing | Just after after the addition | 4 hrs. after the addition | 12 hrs. after the addition | 24 hrs. after the addition |
| B | Thiamine propyl disulfide | 0.04545 | 80.0 | 62.5 | 67.5 | 72.5 | 52.9 | 48.3 |
| | | 0.02270 | 80.0 | 62.5 | 67.5 | 72.5 | 52.9 | 52.9 |
| | | 0.01136 | 80.0 | 62.5 | 67.5 | 72.5 | 62.5 | 62.5 |
| | | 0.00568 | 80.0 | 62.5 | 57.5 | 67.5 | 72.5 | 62.5 |
| | | 0.00284 | 80.0 | 62.5 | 57.5 | 62.5 | 62.5 | 62.5 |
| | | 0.00142 | 80.0 | 62.5 | 57.5 | 62.5 | 57.5 | 48.3 |
| | Thiamine propyl disulfide hydrochloride | 0.04545 | 80.0 | 62.5 | 72.5 | 72.5 | 62.5 | 48.3 |
| | | 0.02270 | 80.0 | 62.5 | 72.5 | 72.5 | 67.5 | 60.0 |
| | | 0.01136 | 80.0 | 62.5 | 72.5 | 72.5 | 67.5 | 62.5 |
| | | 0.00568 | 80.0 | 62.5 | 67.5 | 67.5 | 67.5 | 62.5 |
| | | 0.00284 | 80.0 | 62.5 | 67.5 | 67.5 | 62.5 | 57.5 |
| | | 0.00142 | 80.0 | 62.5 | 62.5 | 62.5 | 57.5 | 48.3 |
| | Control | 0 | 80.0 | 62.5 | 62.5 | 62.5 | 44.2 | 40.2 | thiamine propyl disulfide and thiamine propyl disulfide hydrochloride in concentrations described in the Table 10.

And then the thawed semen samples are further stored at 4° C. for 24 hours. The change of the livability index of the respective thawed semen samples is shown in the Table 10.

Example 11

Goat semen collected from 2 sires is diluted 5-fold at the body temperature with a physiological saline solution and the resultant mixture is subjected to centrifugation to get rid of seminal plasma. After decanting the supernatant, sedimenting spermatozoa is resuspended into an egg yolk citrate buffer solution containing 2.4% of sodium citrate and 20% of fresh yolk in the same volume as the original semen. The resultant semen is diluted 5-fold at the body temperature with an egg yolk citrate buffer solution of the same composition as described above. After being cooled to 4° C. gradually for 1 hour. The diluted semen is further diluted 2-fold with an egg yolk citrate buffer solution containing 2.4% of sodium citrate, 20% of fresh yolk and 14% of glycerin. After being kept standing at 4° C. for 11 hours, 1 ml. each of the diluted semen samples is put into ampoules and the ampoules are closed. After being frozen and stored in a liquid-nitrogen refrigerator at −196° C. for 3 days, each of the ampouled samples is thawed at 4° C. To the thawed semen samples are added thiamine propyl disulfide or thiamine propyl disulfied hydrochloride in concentrations described in the following Table 11, and then the thawed semen samples are stored at 4° C. for 24 hours. The change of the livability index of the respective thawed samples is shown in the Table 11.

TABLE 11

| Bulls | Thiol-type thiamine derivatives | Concentration of tests compounds in the thawed semen | Livability index | | | | | |
|---|---|---|---|---|---|---|---|---|
| | | | Before the refrigeration | After thawing | | | | |
| | | | | Just after thawing | Just after the addition | 4 hrs. after the addition | 12 hrs. after the addition | 24 hrs. after the addition |
| A | Thiamine propyl disulfide | 0.02270 | 80.0 | 27.5 | 57.5 | 57.5 | 57.5 | 22.5 |
| | | 0.01136 | 80.0 | 27.5 | 47.5 | 52.5 | 57.5 | 48.3 |
| | | 0.00568 | 80.0 | 27.5 | 39.5 | 39.5 | 48.3 | 48.3 |
| | | 0.00284 | 80.0 | 27.5 | 36.7 | 36.7 | 43.7 | 26.3 |
| | | 0.00142 | 80.0 | 27.5 | 36.7 | 36.7 | 43.7 | 26.3 |
| | Thiamine propyl disulfide hydrochloride | 0.02270 | 80.0 | 27.5 | 52.5 | 57.5 | 57.5 | 28.3 |
| | | 0.01136 | 80.0 | 27.5 | 52.5 | 52.5 | 57.5 | 43.7 |
| | | 0.00568 | 80.0 | 27.5 | 39.5 | 57.5 | 62.5 | 57.5 |
| | | 0.00284 | 80.0 | 27.5 | 39.5 | 33.3 | 52.5 | 25.8 |
| | | 0.00142 | 80.0 | 27.5 | 31.7 | 33.3 | 43.7 | 25.8 |
| | Control | 0 | 80.0 | 27.5 | 27.5 | 27.5 | 27.5 | 8.3 |

TABLE 11—Continued

| Bulls | Thiol-type thiamine derivatives | Concentration of tests compounds in the thawed semen | Livability index ||||||
|---|---|---|---|---|---|---|---|---|
| | | | Before the refrigeration | After thawing ||||| 
| | | | | Just after thawing | Just after the addition | 4 hrs. after the addition | 12 hrs. after the addition | 24 hrs. after the addition |
| B | Thiamine propyl disulfide | 0.02270 | 80.0 | 27.5 | 57.5 | 62.5 | 52.5 | 44.2 |
| | | 0.01136 | 80.0 | 27.5 | 57.5 | 62.5 | 57.7 | 52.9 |
| | | 0.00568 | 80.0 | 27.5 | 57.5 | 57.5 | 57.7 | 52.9 |
| | | 0.00284 | 80.0 | 27.5 | 52.9 | 57.5 | 52.9 | 52.9 |
| | | 0.00142 | 80.0 | 27.5 | 52.9 | 52.9 | 44.2 | 40.0 |
| | Thiamine propyl disulfide hydrochloride | 0.02270 | 80.0 | 27.5 | 62.5 | 62.5 | 62.5 | 48.3 |
| | | 0.01136 | 80.0 | 27.5 | 62.5 | 62.5 | 62.5 | 62.5 |
| | | 0.00568 | 80.0 | 27.5 | 57.5 | 62.5 | 62.5 | 57.5 |
| | | 0.00284 | 80.0 | 27.5 | 57.5 | 52.9 | 48.3 | 35.8 |
| | | 0.00142 | 80.0 | 27.5 | 52.9 | 52.9 | 52.9 | 35.8 |
| | Control | 0 | 80.0 | 27.5 | 48.3 | 52.9 | 40.0 | 26.7 |

Example 12

Bovine semen collected from 2 bulls is diluted 10-fold with an egg yolk citrate buffer solution containing 2.4% of sodium citrate and 20% of egg yolk and the diluted semen are mixed with the thioltype thiamine derivatives described in the following Table 12 in a concentration of 0.0125%, 0.0625% or 0.0313%. Each of the diluted semen is stored at 4° C. for 4 days. The livability and motility of the spermatozoa in the diluted semen is shown in the Table 12.

TABLE 12

| Bulls | Thiol-type thiamine derivatives | Concentration (percent) | Storage period (days) |||||
|---|---|---|---|---|---|---|---|
| | | | Just after the addition | 1 | 2 | 3 | 4 |
| A | Thiamine propyl disulfide hydrochloride | 0.01250 | 85+++ | 80+++ 5+ | 80+++ 5+ | 70+++ 10+ | 60+++ 10+ |
| | | 0.00625 | 80+++ 5+ | 80+++ 5+ | 80+++ 5+ | 70+++ 5+ | 60+++ 5+ |
| | | 0.00313 | 80+++ 5+ | 75+++ 5+ | 70+++ 5+ | 60+++ 5+ | 55+++ 5+ |
| | S-benzoyl-thiamine O-monophosphate | 0.01250 | 80+++ 5+ | 75+++ 5+ | 70+++ 5+ | 65+++ 5+ | 60+++ 5+ |
| | | 0.00625 | 80+++ 5+ | 75+++ 10+ | 70+++ 5+ | 60+++ 5+ | 55+++ 5+ |
| | | 0.00313 | 80+++ 5+ | 75+++ 10+ | 65+++ 5+ | 55+++ 5+ | 50+++~++ 5+ |
| | O,S-diacetylthiamine hydrochloride | 0.01250 | 80+++ 5+ | 70+++ 5+ | 65+++ 5+ | 55+++ 5+ | 40+++~++ 10+ |
| | | 0.00625 | 80+++ 5+ | 75+++ 5+ | 65+++ 5+ | 55+++ 5+ | 45+++~++ 5+ |
| | | 0.00313 | 80+++ 5+ | 75+++ 5+ | 60+++ 5+ | 50+++ 5+ | 40+++~++ 10+ |
| | O,S-cyclocarbo thiamine hydrochloride | 0.01250 | 80+++ 5+ | 75+++ 5+ | 70+++ 5+ | 60+++ 5+ | 50+++ 5+ |
| | | 0.00625 | 80+++ 5+ | 75+++ 5+ | 65+++ 5+ | 50+++ 10+ | 40+++~++ 10+ |
| | | 0.00313 | 80+++ 5+ | 75+++ 5+ | 55+++ 5+ | 50+++ 5+ | 40+++~++ 5+ |

TABLE 12—Continued

| Bulls | Thiol-type thiamine derivatives | Concentration (percent) | Storage period (days) | | | | |
|---|---|---|---|---|---|---|---|
| | | | Just after the addition | 1 | 2 | 3 | 4 |
| A | TATD [1] | 0.01250 | 80+++ 5+ | 80+++ 5+ | 75+++ 5+ | 70+++ 5+ | 60+++ 5+ |
| | | 0.00625 | 80+++ 5+ | 80+++ 5+ | 70+++ 5+ | 60+++ 5+ | 50+++ 10+ |
| | | 0.00313 | 80+++ 5+ | 75+++ 5+ | 65+++ 5+ | 55+++ 5+ | 50+++ 5+ |
| | O-benzoyl-thiamine-disulfide | 0.01250 | 80+++ 5+ | 80+++ 5+ | 75+++ 5+ | 60+++ 10+ | 50+++~++ 10+ |
| | | 0.00625 | 80+++ 5+ | 75+++ 5+ | 65+++ 5+ | 60+++ 5+ | 50+++~++ 10+ |
| | | 0.00313 | 80+++ 5+ | 75+++ 5+ | 55+++~++ 10+ | 50+++~++ 10+ | 50+++~++ 5+ |
| | Thiamine 2-hydroxymethyl disulfide hydrochloride | 0.01250 | 80+++ 5+ | 80+++ 5+ | 75+++ 5+ | 65+++ 5+ | 50+++~++ 10+ |
| | | 0.00625 | 80+++ 5+ | 80+++ 5+ | 70+++ 10+ | 65+++ 5+ | 55+++~++ 5+ |
| | | 0.00313 | 80+++ 5+ | 75+++ 5+ | 70+++ 5+ | 60+++ 5+ | 50+++~++ 5+ |
| | O,S-dibenzoyl-thiamine | 0.01250 | 80+++ 5+ | 80+++ 5+ | 80+++ 5+ | 60+++ 10+ | 45+++~++ 10+ |
| | | 0.00625 | 80+++ 5+ | 80+++ 5+ | 70+++ 10+ | 60+++ 5+ | 50+++~++ 5+ |
| | | 0.00313 | 80+++ 5+ | 75+++ 5+ | 70+++ 5+ | 60+++ 5+ | 50+++~++ 5+ |
| | O,S-dicarboethoxy thiamine hydrochloride | 0.01250 | 80+++ 5+ | 80+++ 5++ | 80+++ 5+ | 70+++ 5+ | 45+++~++ 10+ |
| | | 0.00625 | 80+++ 5+ | 80+++ 5+ | 70+++ 10+ | 60+++ 5+ | 50+++~++ 5+ |
| | | 0.00313 | 80+++ 5+ | 75+++ 5+ | 60+++ 5+ | 55+++ 5+ | 50+++~++ 5+ |
| | Control | 0 | 80+++ 5+ | 75+++ 5+ | 60+++ 5+ | 50+++~++ 5+ | 35++ 5+ |
| B | Thiamine propyl disulfide hydrochloride | 0.01250 | 80+++ 5+ | 80+++ 5+ | 80+++ 5+ | Not observed | 20++~+ 10+ |
| | | 0.00625 | 80+++ 5+ | 80+++ 5+ | 80+++ 5+ | Not observed | 65+++ 5+ |
| | | 0.00313 | 80+++ 5+ | 75+++ 5+ | 70+++ 5+ | Not observed | 50+++~++ 5+ |
| | S-benzoyl-thiamine O-mono-phosphate | 0.01250 | 80+++ 5+ | 80+++ 5+ | 75+++ 5+ | Not observed | 45+++~++ 5+ |
| | | 0.00625 | 80+++ 5+ | 80+++ 5+ | 70+++ 5+ | Not observed | 55+++ 5+ |
| | | 0.00313 | 80+++ 5+ | 70+++ 5+ | 60+++ 5+ | Not observed | 45+++~++ 5+ |
| | O,S-diacetyl-thiamine hydrochloride | 0.01250 | 80+++ 5+ | 70+++ 10+ | 60+++~++ 5 | Not observed | 45+++~++ 10+ |
| | | 0.00625 | 80+++ 5+ | 75+++ 5+ | 70+++ 5+ | Not observed | 40+++~++ 10+ |
| | | 0.00313 | 80+++ 5+ | 70+++ 5+ | 60+++ 10+ | Not observed | 40+++~++ 10+ |

TABLE 12—Continued

| Bulls | Thiol-type thiamine derivatives | Concentration (percent) | Storage period (days) | | | | |
|---|---|---|---|---|---|---|---|
| | | | Just after the addition | 1 | 2 | 3 | 4 |
| B | O,S-cyclocarbo thiamine hydrochloride | 0.01250 | 80+++ 5+ | 75+++ 5+ | 70+++ 5+ | Not observed | 40+++~++ 10+ |
| | | 0.00625 | 80+++ 5+ | 75+++ 5+ | 70+++ 5+ | Not observed | 40++ 10+ |
| | | 0.00313 | 80+++ 5+ | 70+++ 10+ | 65+++ 10+ | Not observed | 40+++~++ 10+ |
| | TATD [1] | 0.01250 | 80+++ 5+ | 80+++ 5+ | 80+++ 5+ | Not observed | 60+++ 5+ |
| | | 0.00625 | 80+++ 5+ | 80+++ 5+ | 70+++ 5+ | Not observed | 50+++ 5+ |
| | | 0.00313 | 80+++ 5+ | 70+++ 5+ | 60+++ 10+ | Not observed | 40+++~++ 10+ |
| | O-benzoylthiamine-disulfide | 0.01250 | 80+++ 5+ | 80+++ 5+ | 75+++ 5+ | Not observed | 50+++ 5+ |
| | | 0.00625 | 80+++ 5+ | 80+++ 5+ | 65+++ 10+ | Not observed | 45+++~++ 5+ |
| | | 0.00313 | 80+++ 5+ | 80+++ 5+ | 65+++ 10+ | Not observed | 40+++~++ 10+ |
| | Thiamine-2-hydroxy-ethyl disulfide hydrochloride. | 0.01250 | 80+++ 5+ | 80+++ 5+ | 75+++ 5+ | Not observed | 30++ 10+ |
| | | 0.00625 | 80+++ 5+ | 75+++ 5+ | 65+++ 10+ | Not observed | 55+++ 5+ |
| | | 0.00313 | 80+++ 5+ | 70+++ 5+ | 60+++ 5+ | Not observed | 50+++~++ 5+ |
| | Control | 0 | 80+++ 5+ | 70+++ 5+ | 60+++ 10+ | Not observed | 45+++~++ 5+ |

[1] TATD = thiamine (7-methoxycarbonyl-3-acetylthioheptyl) disulfide.

Example 13

Sheep semen collected from 2 sires is diluted 10-fold with an egg yolk cirate buffer solution containing 2.4% of sodium citrate, 20% of fresh yolk and 0.00625% of thiamine tetrahydrofurfuryl disulfide and its hydrochlorate. Each of the diluted semen samples is stored at 4° C. for 4 days. The livability and motility of the spermatozoa in the diluted semen samples is shown in the following Table 13.

TABLE 13

| Bulls | Thiol-type thiamine derivatives | Concentration of test compounds in the semen diluter (percent) | Storage period (days) | | | | |
|---|---|---|---|---|---|---|---|
| | | | 0 | 1 | 2 | 3 | 4 |
| | Control | 0 | 80+++ | 75+++ 5+ | 60+++~+ 5+ | 50+++~+ 5+ | 30+++~++ 10+ |
| A | Thiamine propyl disulfide hydrochloride | 0.00625 | 80+++ | 80+++ | 75+++ 5+ | 70+++ 5+ | 60+++ 5+ |
| | Thiamine tetrahydrofurfuryl disulfide hydrochloride. | 0.00625 | 80+++ | 80+++ | 70+++ 5+ | 70+++ 5+ | 60+++ 5+ |
| | Control | 0 | 85+++ | 80+++ 5+ | 65+++~++ 5+ | 50+++~++ 5+ | 35+++~++ 5+ |
| B | Thiamine propyl disulfide hydrochloride | 0.00625 | 85+++ | 80+++ 5+ | 80+++ 5+ | 75+++ 10+ | 70+++ 5+ |
| | Thiamine tetrahydrofurfuryl disulfide hydrochloride. | 0.00625 | 85+++ | 80+++ 5+ | 80+++ 5+ | 75+++ 10+ | 70+++ 5+ |

Example 14

Sheep semen collected from 2 bulls is diluted five times with an egg yolk citrate buffer solution (the first diluter) containing 2.4% of sodium citrate, 20% of fresh yolk and the resulting diluted semen is cooled to 4° C. gradually for 1 hour. To the diluted semen is added egg yolk citrate buffer solution (The second diluter) containing 2.4% of sodium citrate, 20% of fresh yolk, 14% of glycerin and 0.0125% of thiamine propyl disulfide hydrochloride or thiamine tetrahydrofurfuryl disulfide hydrochloride or thiamine tetrahydrofurfury disulfide hydrochloride. After being kept standing at 4° C. for 12 hours, 1 ml. each of the diluted semen samples is put into a plastic straw of 1 ml. capacity and then the straws are closed. After being frozen and stored in a Dry Ice refrigerator at −79° C. for 7 days, each of the semen samples in the straws is thawed at 4° C. and stored at even temperature for 12 hours. The livability and motility of the respective thawed semen samples is shown in the following Table 14.

Example 16

Fertility test is conducted on the bovine semen preparation of the present invention.

Bovine semen collected from 3 bulls is diluted 5-fold at the body temperature with an egg yolk citrate buffer solution containing 2.4% of sodium citrate and 20% of fresh egg yolk, and the resulting diluted semen is cooled to 4° C. gradually for 1 hour. The diluted semen is further diluted with a negg yolk citrate buffer solution containing 2.4% of sodium citrate, 20% of fresh yolk, 14% of glycerin and 0.0125% of thiamine tetrahydrofurfuryl disulfide hydrochloride at 4° C. The diluted semen is kept standing at 4° C. for 10 hours. 1 ml. each of the diluted semen samples is put into an ampoule of 2 ml. capacity and the ampoules are closed. After being frozen and stored in a liquid-nitrogen refrigerator at −180° C. for 1 to 2 weeks, each of the ampouled semen preparations is thawed at 4° C., and subsequently inseminated to the female animals. The results are shown in the follow-

TABLE 14

| Bulls | Thiol-type thiamine derivative | Concentration of test compounds in the second diluter (percent) | Before freezing | Just after thawing | 12 hours after thawing |
|---|---|---|---|---|---|
| A | Control | 0 | 08+++ | 35+++ / 10+ | 10++ |
| A | Thiamine propyl disulfide hydrochloride | 0.0125 | 80+++ | 65+++ / 10+ | 45+++ / 10+ |
| A | Thiamine tetrahydrofurfuryl disulfide hydrochloride. | 0.0125 | 80+++ | 65+++ / 10+ | 45+++ / 5+ |
| B | Control | 0 | 85+++ | 40+++ / 5+ | 20++~+ |
| B | Thiamine propyl disulfide hydrochloride | 0.0125 | 85+++ | 75+++ / 10+ | 45+++ / 5+ |
| B | Thiamine tetrahydrofurfuryl disulfide hydrochloride. | 0.0125 | 85+++ | 75+++ / 10+ | 45+++ / 10+ |

Example 15

Fertility test is conducted on the bovine semen preparation of the present invention. Bovine semen collected from 4 bulls in diluted 10-fold with an egg yolk citrate buffer solution (containing 2.4% sodium citrate and 20% of egg yolk) supplemented with 0.00625% of thiamine propyl disulfide hydrochloride. The diluted semen is inseminated to the female animals after being stored at 4° C. for 1 to 5 days. The results are shown in the following Table 15. In the results, percentage of conception comes from the first insemination.

TABLE 15

| Bulls | Controls (not containing thiamine propyl disulfide hydrochloride) | | Samples | |
|---|---|---|---|---|
| | Number of inseminated animals | Percentage of conception | Number of inseminated animals | Percentage of conception |
| A | 1,190 | 59.8 | 220 | 64.0 |
| B | 205 | 56.6 | 156 | 69.9 |
| C | 247 | 55.4 | 28 | 60.7 |
| D | 14 | 57.1 | 16 | 62.5 | ing Table 16. In the results, percentage of conception comes from the first insemination.

TABLE 16

| Bulls | Controls (not containing thiamine tetrahydrofurfuryl disulfide hydrochloride) | | Samples | |
|---|---|---|---|---|
| | Number of inseminated animals | Percentage of conception | Number of inseminated animals | Percentage of conception |
| A | 181 | 49.2 | 35 | 68.2 |
| B | 122 | 70.5 | 74 | 82.4 |
| C | 86 | 56.9 | 147 | 64.6 |

Having thus disclosed our invention, what is claimed is:

1. A stabilized semen preparation for artificial insemination of livestock, which is composed of semen of the livestock, a semen diluter and about 0.001% to about 0.1% (weight/volume) of a thiol-type thiamine derivative selected from the group consisting of unsymmetrical thiamine organic disulfide derivatives, S-acylthiamine derivatives, bisthiamine-disulfide derivatives and mixture thereof.

2. A stabilized semen preparation for artificial insemination of ruminant livestock, which is composed of semen of ruminant livestock, a semen diluter and about 0.001% to about 0.1% (weight/volume) of a thiol-type thiamine derivative selected from the group consisting of unsymmetrical thiamine organic disulfide derivatives, S-acyl-thiamine derivatives bisthiamine-disulfide derivatives and mixture thereof.

3. The stabilized semen preparation claimed in claim 2, wherein the ruminant livestock is selected from the group consisting of cattle, goat and sheep.

4. The stabilized semen preparation as claimed in claim 2, wherein the thiol-type thiamine derivative is an unsymmetrical thiamine organic disulfide derivative selected from the group consisting of thiamine propyl disulfide, thiamine tetrahydrofurfuryl disulfide, thiamine allyl disulfide, thiamine (7 - methoxycarbonyl - 3-acetylthioheptyl) disulfide, thiamine 2-hydroxyethyl disulfide and mixture thereof.

5. The stabilized semen preparation as claimed in claim 2, wherein the thiol-type thiamine derivative is a S - acyl - thiamine derivative selected from the group consisting of O,S - diacetyl - thiamine, O,S - dibenzoyl-thiamine, S - acetyl - thiamine O - monophosphate, O,S-dicarboethoxy thiamine, O,S-cyclocarbo thiamine and mixture thereof.

6. The stabilized semen preparation as claimed in claim 2, wherein the thiol-type thiamine derivative is a bisthiaminedisulfide derivative selected from the group consisting of thiaminedisulfide, O-benzoylthiamine-disulfide and mixture thereof.

7. The stabilized semen preparation as claimed in claim 2, wherein the stabilized semen preparation contains about 0.006% to about 0.01% (weight/volume) of the thiol-type thiamine derivative.

8. The stabilized semen preparation as claimed in claim 4, wherein the unsymmetrical thiamine organic disulfide derivative is thiamine tetrahydrofurfuryl disulfide.

9. The stabilized semen preparation as claimed in claim 4, wherein the unsymmetrical thiamine organic disulfide derivative is thiamine propyl disulfide.

10. The stabilized semen preparation as claimed in claim 2, wherein the semen diluter is selected from the group consisting of egg yolk diluter and milk diluter.

11. The stabilized semen preparation as claimed in claim 10, wherein the semen diluter is an egg yolk citrate buffer solution.

12. The stabilized semen preparation as claimed in claim 10, wherein the semen diluter is an egg yolk phosphate buffer solution.

13. The stabilized semen preparation as claimed in claim 10, wherein the semen diluter is a milk diluter which is prepared by heating whole milk or skim milk.

14. A semen diluter for artificial insemination of livestock, which is composed of a basal semen diluter and about 0.001% to about 0.1% (weight/volume) of a thiol-type thiamine derivative selected from the group consisting of unsymmetrical thiamine organic disulfide derivative, S - acyl - thiamine derivatives, bisthiamine-disulfide derivatives and mixture thereof.

15. A semen diluter for artificial insemination of ruminant livestock, which is composed of a basal semen diluter and about 0.001% to about 0.1% (weight/volume) of a thiol-type thiamine derivative selected from the group consisting of unsymmetrical thiamine organic disulfide derivatives, S - acyl - thiamine derivatives, bisthiamine - disulfide derivatives and mixture thereof.

16. A semen diluter as claimed in claim 15, wherein the basal semen diluter is selected from the group consisting of egg yolk diluter and milk diluter.

17. A semen diluter as claimed in claim 15, wherein the basal semen diluter is an egg yolk citrate buffer solution.

18. A semen diluter as claimed in claim 15, wherein the basal semen diluter is an egg yolk phosphate buffer solution.

19. A semen diluter as claimed in claim 15, wherein the basal semen diluter is a milk diluter which is prepared by heating whole milk or skim milk.

20. The semen diluter as claimed in claim 15, wherein the thiol-type thiamine derivative is the unsymmetrical thiamine organic disulfide derivative selected from the group consisting of thiamine propyl disulfide, thiamine tetrahydrofurfuryl disulfide, thiamine allyl disulfide, thiamine (7 - methoxycarbonyl - 3 - acetylthiaheptyl) disulfide, thiamine 2 - hydroxyethyl disulfide and mixture thereof.

21. The semen diluter as claimed in claim 15, wherein the thiol-type thiamine derivative is a S - acyl-thiamine derivative selected from the group consisting of O,S - diacetyl - thiamine, O,S - dibenzoyl - thiamine, S-acetyl - thiamine O - monophosphate, O,S - dicarboethoxy thiamine, O,S-cyclocarbo thiamine and mixture thereof.

22. The semen diluter as claimed in claim 15, wherein the thiol-type thiamine derivative is a bisthamine-disulfide derivative selected from the group consisting of thiamine - disulfide, O - benzoylthiamine - disulfide and mixture thereof.

23. The semen diluter as claimed in claim 15, wherein the semen diluter contains about 0.006% to about 0.01% (weight/volume) of the thiol-type thiamine derivative.

24. The semen diluter as claimed in claim 20, wherein the unsymmetrical thiamine organic disulfide is thiamine tetrahydrofurfuryl disulfide.

25. The semen diluter as claimed in claim 20 wherein the unsymmetrical thiamine organic disulfide is thiamine propyl disulfide.

26. A method for heightening and maintaining the livability and motility of spermatozoa in a semen preparation for artificial insemination of livestock, especially of ruminant livestock, which comprises incorporating a thiol-type thiamine derivative selected from the group consisting of unsymmetrical thiamine organic disulfide derivatives, S - acyl - thiamine derivatives, bisthiamine-disulfide derivatives and mixture thereof in the semen preparation in a concentration range from about 0.001% to about 0.1% (weight/volume).

27. The method according to claim 26, wherein the ruminant livestock is selected from the group consisting of cattle, goat and sheep.

28. The method according to claim 26, wherein the thiol-type thiamine derivative is an unsymmetrical thiamine organic disulfide derivative selected from the group consisting of thiamine propyl disulfide, thiamine tetrahydrofurfuryl disulfide, thiamine allyl disulfide, thiamine (7 - methoxycarbonyl - 3 - acetylthioheptyl) disulfide, thiamine 2 - hydroxyethyl disulfide and mixture thereof.

29. The method according to claim 26, wherein the thiol-type thiamine derivative is a S-acyl-thiamine derivative selected from the group consisting of O,S-diacetyl-thiamine, O,S - dibenzoyl-thiamine, S-acetyl-thiamine O-monophosphate, O,S-dicarboethoxy thiamine, O,S-cyclocarbo thiamine and mixture thereof.

30. The method according to claim 26, wherein the thiol-type thiamine derivative is a bisthiamine - disulfide derivative selected from the group consisting of thiamine - disulfide, O-benzoyl-thiamine-disulfide and mixture thereof.

31. The method according to claim 26, wherein the concentration range of the thiol-type thiamine derivative in the semen preparation is from about 0.006% to about 0.01% (weight/volume).

32. The method according to claim 28, wherein the unsymmetrical thiamine organic disulfide derivative is thiamine propyl disulfide.

33. The method according to claim 28, wherein the unsymmetrical thiamine organic disulfide derivative is thiamine tetrahydrofurfuryl disulfide.

References Cited

UNITED STATES PATENTS

| | | | |
|---|---|---|---|
| 2,598,881 | 6/1952 | Berliner | 195—1.8 |
| 3,005,756 | 10/1961 | Van Demark et al. | 195—1.8 |
| 3,016,380 | 1/1962 | Yurugi et al. | 260—256.5 |
| 3,064,000 | 11/1962 | Oto et al. | 260—256.5 |
| 3,109,000 | 10/1963 | Kawasaki et al. | 260—256.5 |
| 3,185,623 | 5/1965 | Smith et al. | 195—1.8 |
| 3,306,818 | 2/1967 | Folkers et al. | 195—1.8 |

S. R. ROSE, Primary Examiner

U.S. Cl. X.R.

424—105, 255